Aug. 8, 1950  H. RINIA  2,518,067
CENTERED OPTICAL SYSTEM
Filed Dec. 31, 1946
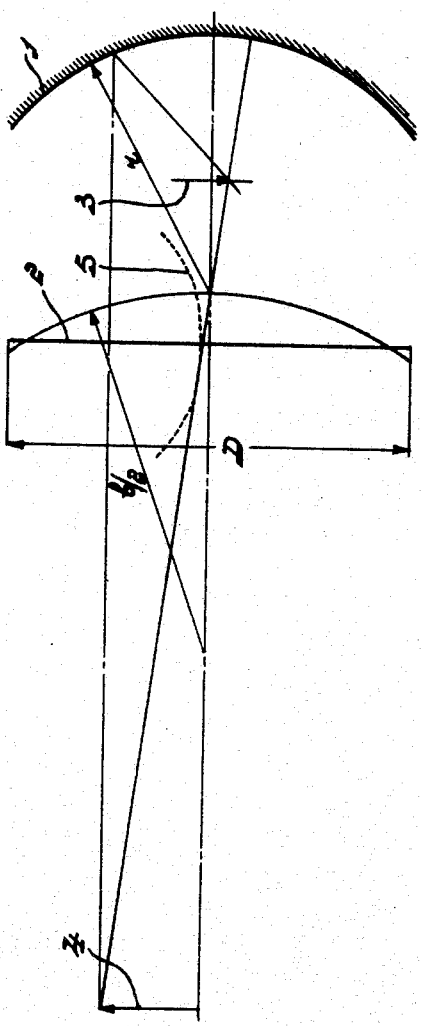
Inventor:
Herre Rinia
By C. F. Ohlendorf
Atty

UNITED STATES PATENT OFFICE 2,518,067

CENTERED OPTICAL SYSTEM

Herre Rinia, Eindhoven, Netherlands, assignor to Hartford National Bank and Trust Company, Hartford, Conn., as trustee Application December 31, 1946, Serial No. 719,440
In the Netherlands January 9, 1946

3 Claims. (Cl. 88—57)

This invention relates to a centered optical system constituted by a concave spherical mirror and an element for correction of the spherical aberration of small paraxial strength and flexion, which exhibits at least one aspherical surface.

In systems of known type the correcting element is placed in the centre of curvature of the mirror.

The invention is based on recognition of the fact that the use of the above-mentioned correcting element in a system having a finite linear magnification has the effect of introducing 5th order coma but that it is possible for the correcting element to be so displaced as to introduce 3rd order coma, which partly neutralises the 5th order coma so that small zonal coma remains. With an arrangement of the correcting element such that the distance between its optical centre and the mirror is comprised between the values $r$ and $$r + \frac{3}{2} \cdot \frac{D^2}{4b}$$

the zonal coma has been found to be very small. In this case $r$, $D$ and $b$ represent respectively the radius of curvature of the mirror, the diameter of the correcting element, and the distance between the image or object and the correcting element. Distance $b$ is approximately equal to the distance between the image or object and the centre of curvature of the mirror, since $$b > \frac{3}{2} \cdot \frac{D^2}{4b}$$

The zonal coma attains a minimum when the distance between the correcting element and the mirror is $$r + \frac{4}{5} \cdot \frac{D^2}{4b}$$

The extent to which this remaining zonal coma occurs shows a flat shape within the said region between $r$ and $$r + \frac{3}{2} \cdot \frac{D^2}{4b}$$

According to the invention, this circumstance may be utilized with advantage by that in such an optical system, the linear magnification of which is substantially constant, the mirror only is made adjustable.

In devices of this kind, for example projection devices and more particularly television projectors, it was common pratice to maintain constant the distance between correcting element and mirror and to make adjustable only the object surface between the correcting element and the mirror, or the assembly of the correcting element and the mirror. In the first-mentioned method of adjustment it is necessary to displace a fairly complicated apparatus such as the projection tube and its auxiliary devices. The second manner of adjustment requires either two coupled adjusting devices, or one adjusting device for two coupled parts: the correcting element and the mirror.

The invention will be explained more fully by reference to the accompanying drawing showing, by way of example, one embodiment thereof.

The sole figure is a view of the optical system in meridian section. The concave spherical mirror is designated 1, the correcting element 2, the object surface 3, and the image surface 4. Numeral 5 indicates the curve showing the relation which exists between the zonal coma, shown as an ordinate, and the position of the correcting element 2. It appears that within a region having a width of 3/2 time the length of the arrow of the segment, the radius of which is equal to half of the distance $b$ between the image and the correcting element and the chord of which is equal to the diameter $D$ of the correcting element 2, this zonal coma has a small value which is comparatively constant. The length of the arrow is $$\frac{D^2}{4b}$$

The zonal coma attains its minimum when the correcting element is arranged at a distance $$r + \frac{4}{5} \cdot \frac{D^2}{4b}$$

from the mirror.

From the shape of curve 5 it appears that the distance between the mirror and the correcting element may be varied within the said region without seriously affecting the optical properties of the system. This circumstance may be utilized, at least if the linear magnification is substantially constant, by making solely the mirror adjustable. It is thus possible, for example in the construction of television projectors according to the usual manufacturing methods, to arrange the mirror 1, the correcting element 2, and a projection tube having a fluorescent surface at the area of the object surface 3, together with the image surface 4, and subsequently to effect the ultimate focusing operation by displacing solely the mirror 1, thus compensating for the unavoidable tolerances.

What I claim is:

1. A centered optical reflecting system in which coma introduced by the system is reduced to a small magnitude which comprises a concave spherical mirror, and a correcting element for correcting spherical aberration having a small paraxial strength and having at least one aspherical surface, said system having a finite linear magnification, and said correcting element being positioned at a distance from the mirror greater than the center of curvature of said mirror and at distance greater than $r$ and less than about $$r + \frac{3}{2} \cdot \frac{D^2}{4b}$$

where $r$, $D$ and $b$ represent respectively the radius of curvature of the mirror, the diameter of the correcting element, and the distance between the correcting element and an image reflected from said mirror.

2. A centered optical system as claimed in claim 1, wherein the said distance is equal to $$r + \frac{4}{5} \cdot \frac{D^2}{4b}$$

3. A centered optical system as claimed in claim 1, the linear magnification of which is substantially constant, and means supporting said mirror for displacement relative to said correcting element and for varying the distance therebetween to focus said mirror.

HERRE RINIA.

REFERENCES CITED

The following references are of record in the file of this patent:

UNITED STATES PATENTS

| Number | Name | Date |
|---|---|---|
| 2,170,979 | Straubel | Aug. 29, 1939 |
| 2,273,801 | Landis | Feb. 17, 1942 |
| 2,298,808 | Ramberg | Oct. 13, 1942 |

OTHER REFERENCES

Baker: Proc. Amer. Phil. Soc., vol. 82, No. 3, 1940, pages 330 and 331.

Epstein et al.: Journal Soc. Motion Picture Engrs., vol. 44, No. 6, June 1945, pages 444 and 445.